US007583293B2

(12) United States Patent
Norskog

(10) Patent No.: US 7,583,293 B2
(45) Date of Patent: Sep. 1, 2009

(54) APPARATUS AND METHOD FOR GENERATING MULTI-IMAGE SCENES WITH A CAMERA

(75) Inventor: Allen C. Norskog, Fort Collins, CO (US)

(73) Assignee: Aptina Imaging Corporation, Grand Cayman (KY)

( * ) Notice: Subject to any disclaimer, the term of this patent is extended or adjusted under 35 U.S.C. 154(b) by 876 days.

(21) Appl. No.: 10/011,155

(22) Filed: Dec. 6, 2001

(65) Prior Publication Data

US 2004/0201755 A1    Oct. 14, 2004

(51) Int. Cl.
*H04N 5/225* (2006.01)
*H04N 7/00* (2006.01)

(52) U.S. Cl. .................... 348/218.1; 348/36; 348/39

(58) Field of Classification Search .............. 348/218.1, 348/333.02, 333.04, 36–39, 373, 335, 64, 348/333.03; 382/284; 345/634–635; 386/46
See application file for complete search history.

(56) References Cited

U.S. PATENT DOCUMENTS

| 4,714,962 | A | * | 12/1987 | Levine | 348/64 |
| 5,483,284 | A | * | 1/1996 | Ishiguro | 348/335 |
| 5,578,813 | A | | 11/1996 | Allen et al. | |
| 5,644,139 | A | | 7/1997 | Allen et al. | |
| 5,666,459 | A | * | 9/1997 | Ohta et al. | 386/46 |
| 5,786,804 | A | | 7/1998 | Gordon | |
| 6,057,540 | A | | 5/2000 | Gordon et al. | |
| 6,151,015 | A | | 11/2000 | Badyal et al. | |
| 6,243,103 | B1 | * | 6/2001 | Takiguchi et al. | 345/634 |
| 6,281,882 | B1 | | 8/2001 | Gordon et al. | |
| 6,456,323 | B1 | * | 9/2002 | Mancuso et al. | 348/218.1 |
| 6,704,465 | B2 | * | 3/2004 | Aoi et al. | 382/305 |
| 6,714,249 | B2 | * | 3/2004 | May et al. | 348/373 |
| 7,133,068 | B2 | * | 11/2006 | Fisher et al. | 348/218.1 |
| 2001/0026684 | A1 | * | 10/2001 | Sorek et al. | 396/322 |
| 2002/0030748 | A1 | * | 3/2002 | Kitaguchi et al. | 348/218 |

FOREIGN PATENT DOCUMENTS

JP         2001218098   * 10/2001

OTHER PUBLICATIONS

Digital Photography Review Homepage; "Canon Pro90 Is Review"; Dec. 6, 2001 www.dpreview.com/reviews/canonpro90/page 5.asp; 4 pgs.
d-store Homepage; "Canon Photo Stitch"; www.d-store.com/d-store/canon_photo_stitch.htm; 2 pgs, Dec. 6, 2001.

* cited by examiner

*Primary Examiner*—Jason Chan
*Assistant Examiner*—Kelly L Jerabek
(74) *Attorney, Agent, or Firm*—Ratner Prestia

(57) ABSTRACT

An apparatus configured for use in a camera identifies appropriate times to capture optical images with the camera. The apparatus includes a motion detector for generating movement data based on movement of the camera. A controller coupled to the movement detector identifies appropriate times to capture optical images based on the movement data.

23 Claims, 4 Drawing Sheets

APPARATUS AND METHOD FOR GENERATING MULTI-IMAGE SCENES WITH A CAMERA

REFERENCE TO RELATED PATENTS

This Application is related to the subject matter described in the following U.S. patents: U.S. Pat. No. 5,578,813, filed Mar. 2, 1995, issued Nov. 26, 1996, and entitled FREEHAND IMAGE SCANNING DEVICE WHICH COMPENSATES FOR NON-LINEAR MOVEMENT; U.S. Pat. No. 5,644,139, filed Aug. 14, 1996, issued Jul. 1, 1997, and entitled NAVIGATION TECHNIQUE FOR DETECTING MOVEMENT OF NAVIGATION SENSORS RELATIVE TO AN OBJECT; and U.S. Pat. No. 5,786,804, filed Oct. 6, 1995, issued Jul. 28, 1998, and entitled METHOD AND SYSTEM FOR TRACKING ATTITUDE. These three patents describe techniques of tracking position movement. Those techniques are a component in one embodiment of the present invention.

This application is also related to the subject matter described in U.S. Pat. No. 6,057,540, filed Apr. 30, 1998, issued May 2, 2000, and entitled MOUSELESS OPTICAL AND POSITION TRANSLATION TYPE SCREEN POINTER CONTROL FOR A COMPUTER SYSTEM; U.S. Pat. No. 6,151,015, filed Apr. 27, 1998, issued Nov. 21, 2000, and entitled PEN LIKE COMPUTER POINTING DEVICE; and U.S. Pat. No. 6,281,882, filed Mar. 30, 1998, issued Aug. 28, 2001, and entitled PROXIMITY DETECTOR FOR A SEEING EYE MOUSE. These three related patents describe screen pointing devices, with embodiments that use techniques described in U.S. Pat. Nos. 5,578,813, 5,644,139, and 5,786,804.

THE FIELD OF THE INVENTION

This invention relates generally to cameras. This invention relates more particularly to the generation of multi-image scenes with a camera using an optical motion sensing device for tracking motion.

BACKGROUND OF THE INVENTION

Existing techniques for generating multi-image scenes with a camera, such as panoramic pictures constructed from multiple images, are typically manual in nature, and usually require trial and error to generate the desired results. One such technique involves placing a camera on a tripod, and placing a protractor under the camera. A first picture is taken, the camera is rotated a fixed number of degrees, and then a second picture is taken. This process may be repeated to take any desired number of pictures. For a conventional analog camera, the film is then developed, and an individual determines from the pictures whether there is any undesired overlap or spacing between the pictures. If there is any undesired overlap or spacing, additional pictures of the scene may be taken, using a different amount of rotation than was used previously. Thus, trial and error is needed to obtain the optimum amount of rotation of the camera to generate images for a multi-image scene.

The above-described prior art technique may also be applied to a digital camera. In addition, some existing digital cameras include a built-in display that allows a user to attempt to "line-up" currently viewed images with a previously captured image, to facilitate capturing images for a multi-image scene. For example, a previously captured image or portion of an image is displayed on one half of the built-in display, and a currently viewed image, or portion of an image is displayed on the other half of the built-in display, and a user manually snaps a picture when the images appear to line-up. This process relies on the subjective judgment of the individual to line-up successive images.

It would be desirable to provide a camera that automatically determines appropriate times to capture images for a multi-image scene, without requiring the user to manually line-up successive images.

SUMMARY OF THE INVENTION

One form of the present invention provides an apparatus configured for use in a camera to identify appropriate times to capture optical images with the camera. The apparatus includes a motion detector for generating movement data based on movement of the camera. A controller coupled to the movement detector identifies appropriate times to capture optical images based on the movement data.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope, of the present invention is defined by the appended claims.

Figure 1:
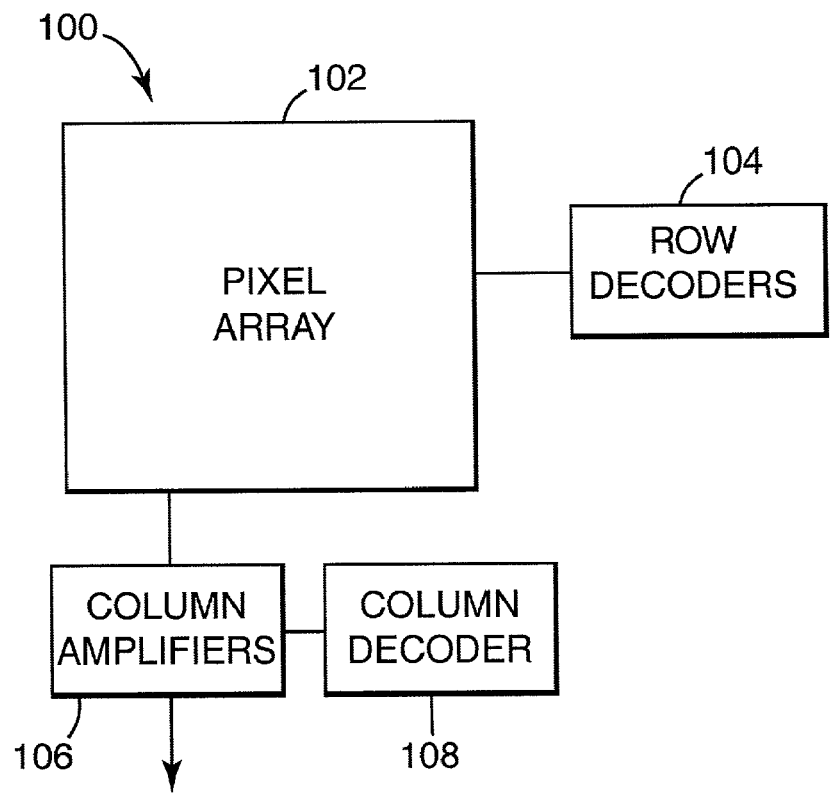
FIG. 1 is an electrical block diagram illustrating major components of a prior art sensor array.

FIG. 1 is an electrical block diagram illustrating major components of a prior art sensor array 100, which is suitable for using in a digital camera according to one embodiment of the present invention. Sensor array 100 includes pixel array 102, row decoders 104, column amplifiers 106, and column decoder 108. Pixel array 102 includes a plurality of pixel circuits (not shown), with each pixel circuit providing one pixel of image information. The pixels in pixel array 102 are organized into a plurality of rows and a plurality of columns (e.g., 480×640). Existing sensor arrays, such as sensor array 100, also typically include other components, such as gain amplifiers, analog-to-digital converters, and digital control logic (not shown), to perform additional functions, such as amplifying, digitizing, and processing the signals from column amplifiers 106.

Pixel information from pixel array 102 is sampled in rows. The sampling time for each row of pixels is referred to as a row sample interval. A row of pixels in pixel array 102 is selected by row decoders 104.

The image signal generated by each pixel circuit in array 102 is the difference between a sampled reset voltage level and the voltage on a photodiode in the pixel circuit after an integration period (i.e., a sampled integration signal level). At the end of a row sample interval, the difference between the reset and integrated signal levels is held on the outputs of column amplifiers 106, referenced to a common mode reference level. During a column processing interval, column amplifiers 106 are sequentially selected by column decoder 108 to output the corresponding held level.

With appropriate optics, a sensor array, such as sensor array 100, can be configured to capture images of near-field objects or far-field objects. Optical pointing devices, such as on optical mouse, use appropriate lenses for directing images of near-field objects (e.g., a desktop supporting the optical mouse) onto the sensor array. In contrast, a digital camera uses an appropriate lens for directing images of far-field objects onto the sensor array.

Figure 2:
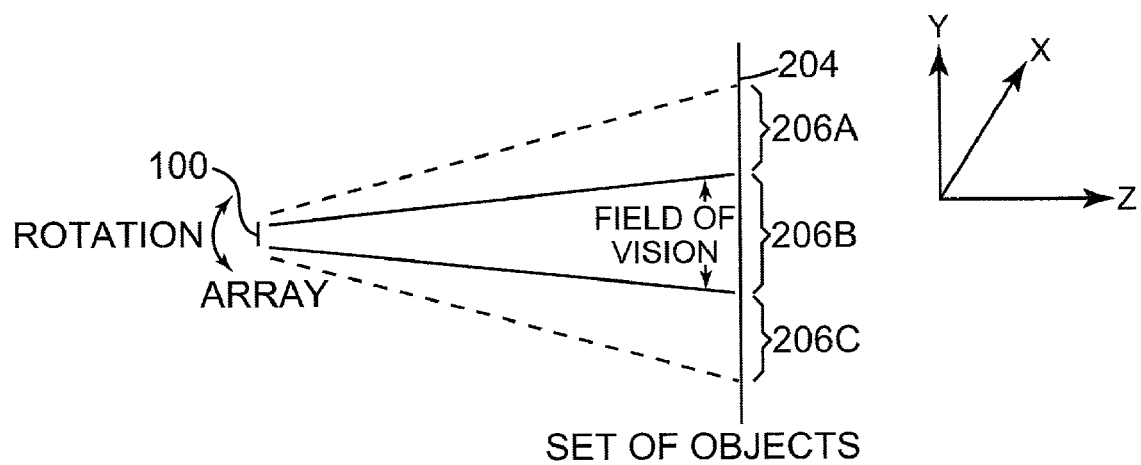
FIG. 2 is a diagram illustrating a sensor array configured to be incorporated into a digital camera for capturing images of far-field objects.

FIG. 2 is a diagram illustrating a two-dimensional sensor array 100 configured to be incorporated into a digital camera for capturing images of far-field objects. An active surface of sensor array 100 is perpendicular to the paper in FIG. 2, and is pointed at a scene or set of objects 204. A lens 308B (shown in FIGS. 3A and 4) focuses the portion of scene 204 within the field of vision 206B of the lens onto the active surface of sensor array 100.

A three-dimensional (X, Y, Z) coordinate system is also shown in FIG. 2. Sensor array 100 is aligned with the plane formed by the X-axis (into the paper) and the Y-axis. If sensor array 100 is rotated about the Y-axis (i.e., looking at scene 204, array 100 is rotated left or right), the image on the surface of sensor array 100 moves as array 100 is rotated. The motion can be detected by correlating successive images, as described below.

As shown in FIG. 2, if sensor array 100 is rotated to the left, lens 308B focuses the portion of scene 204 within field of vision 206A of the lens onto the surface of sensor array 100. And if sensor array 100 is rotated to the right, lens 308B focuses the portion of scene 204 within field of vision 206C of the lens onto the surface of sensor array 100. As described below, when a user selects a multi-image mode, one embodiment of the present invention automatically identifies appropriate times for images to be captured while sensor array 100 is rotated, so that images from multiple different fields of vision 206A-206C can later be combined into a single, seamless, multi-image scene.

If sensor array 100 is rotated about the X-axis (i.e., looking at scene 204, array 100 is rotated up or down), then vertical motion of the images directed onto sensor array 100 can be detected, which facilitates identification of appropriate times for pictures to be taken while sensor array 100 is rotated in this dimension.

Figure 3A:
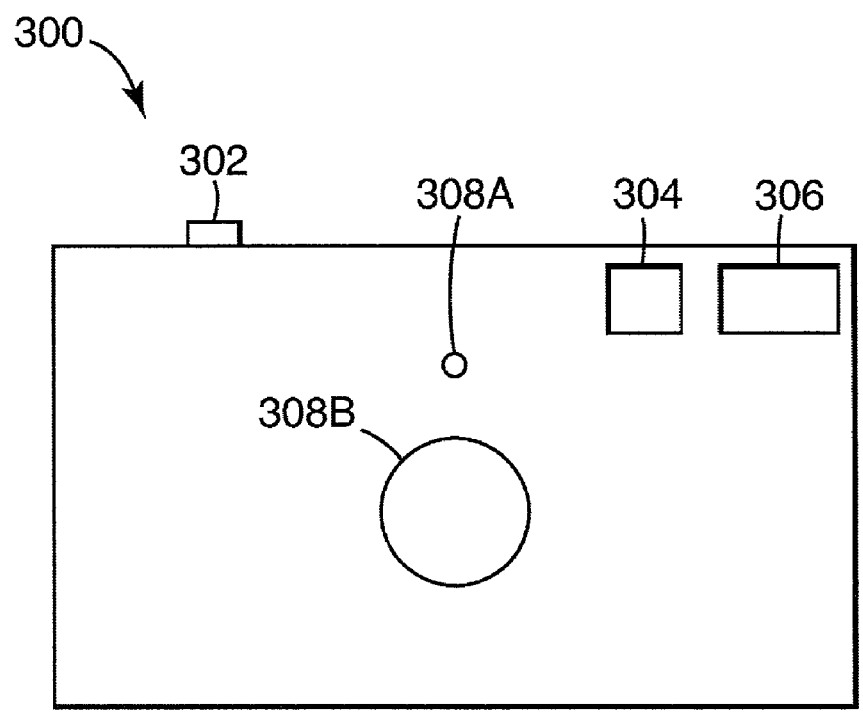
FIG. 3A is a diagram illustrating a simplified front view of a digital camera for capturing images for a multi-image scene according to one embodiment of the present invention.
Figure 3B:
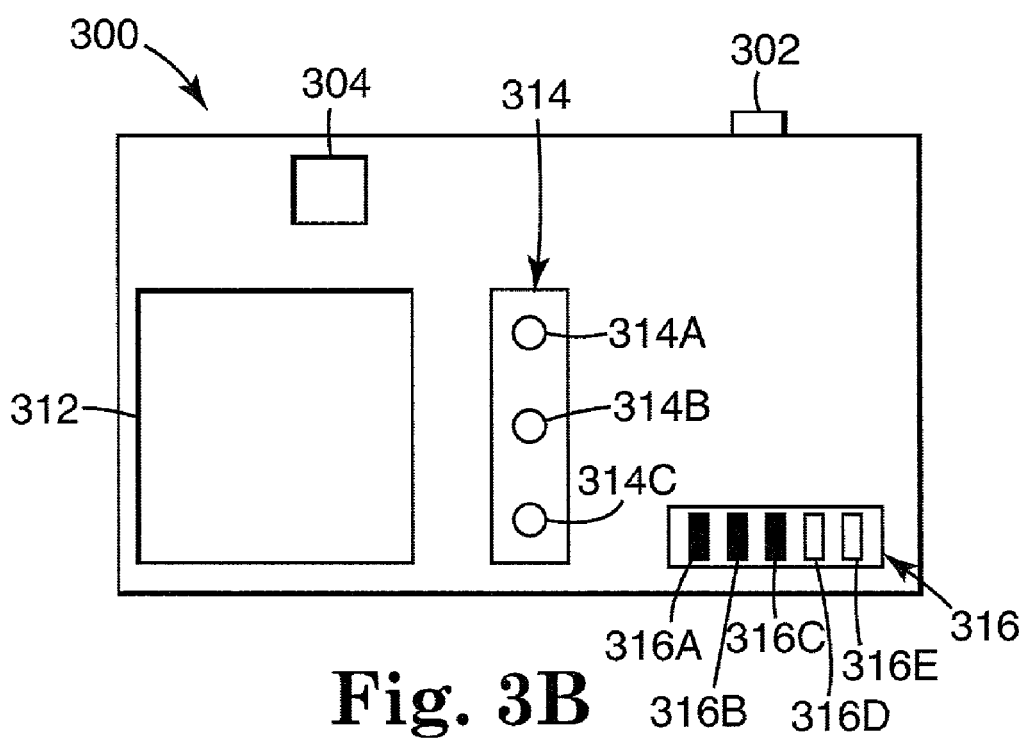
FIG. 3B is a diagram illustrating a simplified rear view of the digital camera shown in FIG. 3A.

FIG. 3A is a diagram illustrating a simplified front view of a digital camera 300 for capturing images for a multi-image scene according to one embodiment of the present invention. FIG. 3B is a diagram illustrating a simplified rear view of digital camera 300. As shown in FIGS. 3A and 3B, camera 300 includes button 302, viewfinder 304, flash 306, lenses 308A and 308B, display 312, user input device 314, and LED display 316. In one embodiment, display 312 is a color liquid crystal display (LCD). User input device 314 includes buttons 314A-314C. Although a button-based user input device 314 is shown, any conventional user input device may be used for camera 300 in alternative embodiments. LED display 316 includes LEDs 316A-316E.

In normal operation, a user looks through viewfinder 304 and positions camera 300 to capture a desired image. When camera 300 is in position, the user presses button 302 to capture the desired image. An optical image is focused by lens 308B onto image sensor 100 (shown in FIG. 4), which generates pixel data that is representative of the optical image. Captured images are displayed on display 312. Flash 306 is used to illuminate an area to capture images in low light conditions.

A multi-image mode may be selected by a user with user input device 314. User input device 314 also allows a user to enter other data and select other camera options. LED display 316 provides feedback to the user in one embodiment of a multi-image mode. Optical images are focused by lens 308A onto navigation sensor 402 (shown in FIG. 4), which generates X, Y movement data for use in the multi-image mode. User input device 314, LED display 316, and multi-image modes, are discussed in further detail below with reference to FIGS. 4 and 5.

Figure 4:
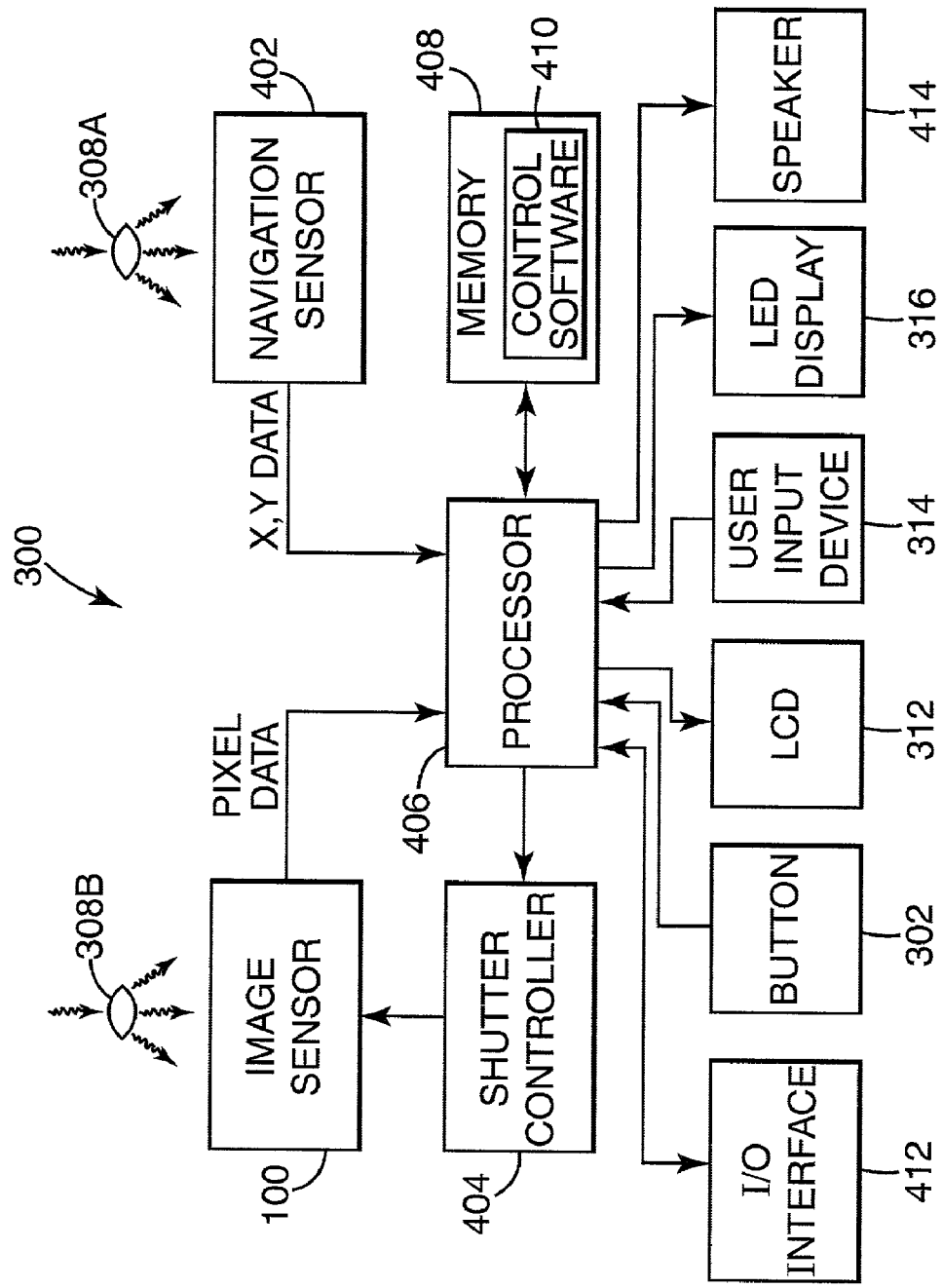
FIG. 4 is an electrical block diagram illustrating major components of the digital camera shown in FIGS. 3A and 3B.

FIG. 4 is an electrical block diagram illustrating major components of digital camera 300. Camera 300 includes lenses 308A and 308B, image sensor 100, navigation sensor 402, shutter controller 404, processor 406, memory 408, input/output (I/O) interface 412, button 302, LCD 312, user input device 314, LED display 316, and speaker 414. Control software 410 for controlling processor 406 is stored in memory 408. In one embodiment, memory 408 includes some type of random access memory (RAM) and non-volatile memory, but can include any known type of memory storage.

I/O interface 412 is configured to be coupled to a computer or other appropriate electronic device (e.g., a personal digital assistant or PDA), for transferring information between the electronic device and camera 300, including downloading captured images from camera 300 to the electronic device.

In operation, a currently viewed image is directed by lenses 308A and 308B onto navigation sensor 402, and image sensor 100, respectively. Navigation sensor 402 continually captures images, correlates images, and provides X, Y movement information to processor 406. Image sensor 100 captures images when a user presses button 302 on camera 300, or when processor 406 causes image sensor 100 to automatically capture images in a multi-image mode. In one embodiment, image sensor 100 is a color sensor with hundreds of thousands, or millions of pixels, and navigation sensor 402 is a black and white (or gray-scale) sensor with hundreds of pixels (e.g., a 16×16 or 20×20 pixel sensor). By using a smaller, non-color sensor for navigation sensor 402, movement information may be generated faster than with a larger, color sensor. For example, in one embodiment, image sensor 100 captures 10 to 15 frames per second, and navigation sensor 402 captures thousands of frames per second.

In one form of the invention, camera 300 provides multiple modes of operation, including a normal mode, an automatic multi-image mode, and a feedback multi-image mode. A desired mode of operation is selected by a user with user input device 314. If a normal mode of operation is selected, digital camera 300 operates in a conventional manner, and movement information from navigation sensor 402 is not used. If one of the multi-image modes is selected, navigation sensor 402 generates movement data indicative of movement of camera 300 (and, correspondingly, of sensors 100 and 402). The movement data is used by processor 406 to either automatically cause images to be captured by image sensor 100 at appropriate times as the camera is rotated or otherwise moved, or to provide an indication or notification to the user, with LED display 316, speaker 414, or both, of appropriate times to take the pictures.

With user input device 314, a user may also select the number of pictures to be taken for a multi-image scene, a desired amount of overlap or spacing between images (if such overlap or spacing is desired), as well as a desired orientation of a multi-image scene (e.g., horizontal or vertical). In one form of the invention, memory 408 stores default information for the multi-image modes, including a default multi-image mode (e.g., automatic multi-image mode), a default number of images to capture for a multi-image mode session (e.g., 2 images), a default spacing between images (e.g., none), and a default orientation (e.g., horizontal). The default information may be modified by a user with user input device 314.

One preferred motion detection technique according to the present invention involves optically detecting motion by directly imaging as an array of pixels the various particular optical features projected onto navigation sensor 402. Light reflected from a set of far-field objects 204 is focused by lens 308A onto navigation sensor 402. The responses of individual photo detectors in sensor 402 are digitized to a suitable resolution and stored as a frame into corresponding locations within an array of memory. The digitized images are correlated to determine X, Y movement information. The operation of navigation sensor 402 is described in further detail below with reference to FIG. 5.

Based on the X, Y movement information provided by navigation sensor 402, processor 406 determines when an image has moved across sensor 402. For example, if navigation sensor 402 is 20 pixels wide, processor 406 knows that the image has completely traversed sensor 402 when the image moves precisely 20 pixels across. In one embodiment, a multi-image mode session begins by a user pressing button 302, causing image sensor 100 to capture a first image. Navigation sensor 402 also captures a first image of the same scene. The pixel data for the first image is output by image sensor 100 to processor 406. Navigation sensor 402 continues to capture and correlate images as camera 300 is rotated, and outputs movement data based on the correlation. Processor 406 monitors the X, Y movement information output by navigation sensor 402 as camera 300 is rotated, and determines, based on the movement information, the point in time at which the first image has moved entirely across navigation sensor 402.

If the automatic multi-image mode has been selected, processor 406 sends a signal to shutter controller 404 after the first image has moved across sensor 402, which causes image sensor 100 to capture a second image. Processor 406 continues to monitor the X, Y movement information, and causes images to be captured by image sensor 100 at appropriate times based on the received movement information, until the number of images specified by the user for the session has been captured. If the user has specified a desired amount of spacing or overlap between images, processor 406 causes images to be captured by image sensor 100 with the desired spacing or overlap.

A feedback multi-image mode session operates in essentially the same manner as the automatic multi-image mode, but rather than pictures being taken automatically at appropriate times, processor 406 causes a notification to be provided to a user of the appropriate times to take pictures based on the preferences specified by the user.

In one embodiment, a feedback multi-image mode session begins by a user pressing button 302, causing image sensor 100 to capture a first image. Navigation sensor 402 also captures a first image of the same scene. The pixel data for the first image is output by image sensor 100 to processor 406. Navigation sensor 402 continues to capture and correlate images as camera 300 is rotated, and outputs movement data based on the correlation. Processor 406 monitors the X, Y movement information output by navigation sensor 402 as camera 300 is rotated, and determines, based on the movement information, the point in time at which the first image has moved entirely across navigation sensor 402. After the first image has moved across the sensor 402, processor 406 provides a notification to the user that it is time to capture another image. The user then presses button 302, which causes image sensor 100 to capture a second image.

As with the automatic multi-image mode, in the feedback multi-image mode, processor 406 continues to monitor the X, Y movement information after each image is captured by image sensor 100, and causes notifications to be provided at appropriate times based on the received movement information, until the number of images specified by the user for the session has been captured. If the user has specified a desired amount of spacing or overlap between images, processor 406 causes notifications to be provided based on the desired spacing or overlap.

In one form of the invention, the notification in the feedback multi-image mode is provided via LED display 316, speaker 414, or both. In one embodiment, when LED display 316 is used to provide a notification, processor 406 causes the individual LEDs 316A-316E to light up in a step-like manner based on the rotation of camera 300. For example, after an image is captured by image sensor 100, processor 406 causes LED 316A to light up as camera 300 begins to rotate. As camera 300 is rotated closer to the appropriate position to capture another image, processor 406 causes additional, successive LEDs to light up (e.g., 316B-316C). When camera 300 has been rotated to the appropriate position to capture another image, processor 406 causes all of the LEDs 316A-316E to light up, which indicates to the user that it is time to push button 302 to capture another image. In alternative embodiments, other techniques for providing a visual indication to the user may be used.

In one embodiment, when speaker 414 is used to provide notifications in the feedback multi-image mode, processor 406 causes speaker 414 to emit a tone with an increasing pitch and/or volume as camera 300 is rotated nearer to the appropriate position to capture an image. In alternative embodiments, a single tone or beep, or multiple tones or beeps with varying pitch, volume, and/or time between tones or beeps, or other audible indication, may be used to indicate to the user that it is an appropriate time to take a picture.

In one embodiment, field of vision information, representing the amount of field of vision for lenses 308A and 308B, is stored in memory 408, and is used by processor 406 to determine appropriate times to capture images with image sensor 100. The field of vision information is modifiable if different lenses are attached to camera 300. In one embodiment, in determining appropriate times to capture images with image sensor 100, processor 406 makes appropriate compensations to the timing based on a current zoom state of a camera with an adjustable zoom feature.

Using a navigation sensor 402 that is smaller than image sensor 100 can result in undesirable overlap or spacing between images captured by sensor 100 for a multi-image scene. To minimize any loss in accuracy due to sensor size differences, in one embodiment, navigation sensor 402 reports motion at a resolution of a fraction of a pixel (e.g., a one tenth pixel resolution would provide steps at 19.8 pixels, 19.9 pixels, 20.0 pixels). This allows processor 406 to more precisely identify when an image has moved across sensor 402. In one form of the invention, to further increase the precision in identifying appropriate times to capture images with image sensor 100, lens 308A has a field of vision that is less than the field of vision of lens 308B. For example, if the field of vision of lens 308A is one half of the field of vision of lens 308B, an image directed onto navigation sensor 402 would need to move 40 pixels before image sensor 100 captures a new image, assuming that navigation sensor 402 has 20 pixels on a side. Other modifications may also be used to increase precision, including using sensors 100 and 402 that are closer in size (i.e., number of pixels).

Figure 5:
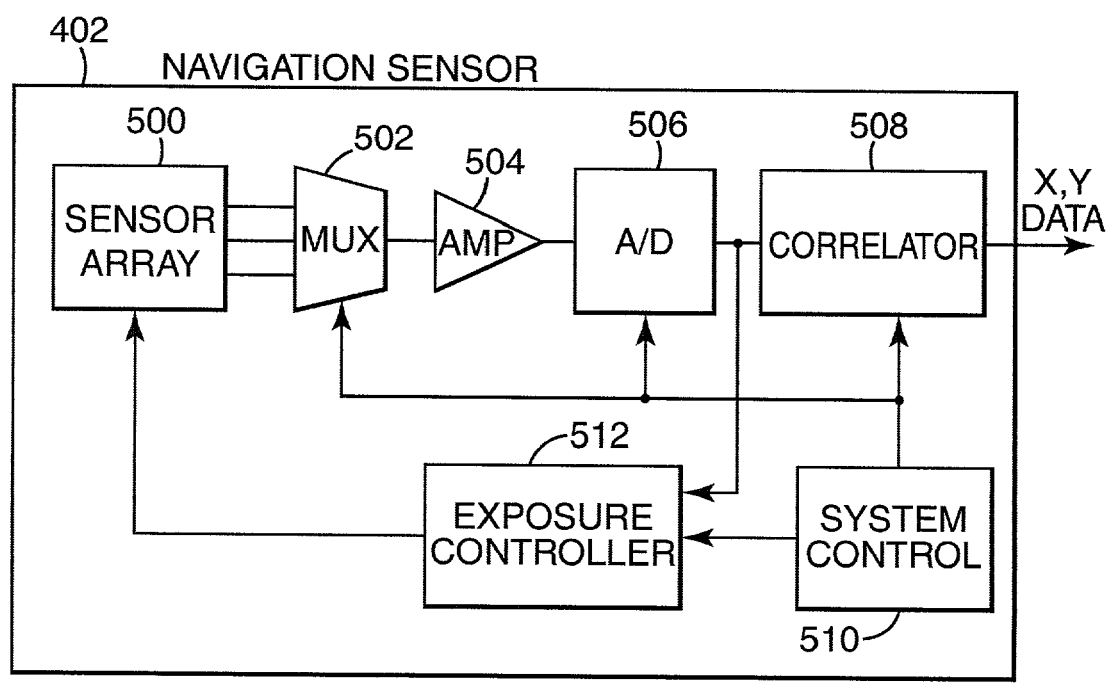
FIG. 5 is an electrical block diagram illustrating major components of the navigation sensor shown in FIG. 4.

FIG. 5 is an electrical block diagram illustrating major components of navigation sensor 402 according to one embodiment of the present invention. Navigation sensor 402 includes sensor array 500, multiplexer 502, amplifier 504, analog to digital (A/D) converter 506, correlator 508, system controller 510, and exposure controller 512.

The operation of navigation sensor 402 is primarily controlled by system controller 510, which is coupled to multiplexer 502, A/D converter 506, correlator 508, and exposure controller 512. In operation, according to one embodiment, light is directed onto a surface or set of far-field objects 204. Reflected light from surface 204 is directed by lens 308A to light sensitive photo sensors within sensor array 500.

During a charge accumulation time, charge accumulates within each photo sensor in array 500, creating a voltage that is related to the intensity of light incident on the photo sensor. At the end of the charge accumulation time, multiplexer 502 connects each photo sensor in turn to amplifier 504 and A/D converter 506, to amplify and convert the voltage from each photo sensor to a digital value. The photo sensors are then discharged, so that the charging process can be repeated.

Based on the level of voltage from each photo sensor, A/D converter 506 generates a digital value of a suitable resolution (e.g., one to eight bits) indicative of the level of voltage. The digital values represent digital images or digital representations of the optical images directed by lens 308A onto sensor array 500. The digital values may be processed, then stored as frames into corresponding locations within an array of memory within correlator 508. In one embodiment, each pixel in a frame corresponds to one of the photo sensors in array 500.

The overall number of photo sensors in array 500 is preferably large enough to receive an image having several features. In this way, images of such features produce translated patterns of pixel information as navigation sensor 402 moves. The number of photo sensors in array 500 and the frame rate at which their contents are captured and digitized cooperate to influence how fast navigation sensor 402 can be moved and still track movement. Tracking is accomplished by correlator 508 by comparing newly captured sample frames with previously captured reference frames to ascertain movement information. In one form of the invention, correlation of frames to determine movement information is implemented using conventional techniques, such as those described in the patents identified above in the Reference to Related Patents section, and as summarized below.

In one embodiment, the entire content of one of the frames is shifted by correlator 508 by a distance of one pixel successively in each of the eight directions allowed by a one pixel offset trial shift (one over, one over and one down, one down, one up, one up and one over, one over in the other direction, etc.). That adds up to eight trials. Also, since there might not have been any motion, a ninth trial "null shift" is also used. After each trial shift, those portions of the frames that overlap each other are subtracted by correlator 508 on a pixel by pixel basis, and the resulting differences are preferably squared and then summed to form a measure of similarity (correlation) within that region of overlap. Larger trial shifts are possible, of course (e.g., two over and one down), but at some point the attendant complexity ruins the advantage, and it is preferable to simply have a sufficiently high frame rate with small trial shifts. The trial shift with the least difference (greatest correlation) can be taken as an indication of the motion between the two frames.

In addition to providing digital images to correlator 508, A/D converter 506 also outputs digital image data to exposure controller 512. Exposure controller 512 helps to ensure that successive images have a similar exposure, and helps to prevent the digital values from becoming saturated to one value. Controller 512 checks the values of digital image data and determines whether there are too many minimum values or too many maximum values. If there are too many minimum values, controller 512 increases the charge accumulation time of sensor array 500. If there are too many maximum values, controller 512 decreases the charge accumulation time of sensor array 500.

It will be understood by a person of ordinary skill in the art that functions performed by digital camera 300, including functions performed by navigation sensor 402, may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

In one embodiment, images captured by camera 300 may be downloaded to a computer via I/O interface 412. Downloaded images for a multi-image scene may then be "stitched" together into a single image using appropriate software. In one embodiment, X, Y information provided by navigation sensor 402 associated with each image for a multi-image scene is stored in memory 408 when each such image is captured. The X, Y information is then downloaded with the images to facilitate combination of the images into a single image. In an alternative embodiment, processor 406 combines images for a multi-image scene into a single image. Such combined images may then be displayed on LCD 312, and/or downloaded to a computer via I/O interface 412.

Embodiments of the present invention may be used to capture multi-image panoramic scenes as camera 300 is rotated left or right, or moved horizontally, including scenes involving a complete 360 degree rotation. Embodiments of the present invention may also be used to capture multi-image scenes as camera 300 is rotated up or down, or moved vertically. In addition, in one embodiment, camera 300 may held in a fixed position, and capture images of moving objects at appropriate times. For example, camera 300 may be positioned over an assembly line belt for an inspection process, and capture images of parts moving by on the assembly line at appropriate times based on motion information provided by navigation sensor 402.

Although embodiments of the present invention have been described in the context of a digital camera, the techniques described herein are also adaptable to conventional analog cameras. In an analog camera embodiment of the present invention, the image sensor 100 would be replaced by conventional film. Embodiments of the present invention may also be implemented with a single image sensor, rather than using two image sensors 100 and 402. In such embodiments, the single image sensor is configured to perform the functions of both image sensors 100 and 402.

Embodiments of the present invention are easier to use and provide more precision than the manual, trial and error techniques of the prior art. In addition, embodiments of the present invention eliminate the need for the user to attempt to line-up neighboring images on a built-in display as is done in some existing digital cameras, since neighboring images may be captured automatically with no subjective guessing on the part of the user.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An apparatus configured for use in a camera to identify appropriate times to capture images of a scene with the camera, the apparatus comprising:
    an input unit configured to accept input data including a desired amount of overlap to be included in images to be captured;
    a memory configured to changeably store the input data;
    an image sensor for capturing the images;
    an optical motion detector, separate from the image sensor, configured to capture a plurality of navigation images and to generate movement data based on correlations between successive ones of the navigation images; and
    a controller coupled to the motion detector for identifying appropriate times for the image sensor to capture the images based on the movement data and the desired amount of overlap if the desired amount of overlap has been provided and a default spacing between the images if no desired amount of overlap has been provided.

2. The apparatus of claim 1, wherein the controller is configured to cause the images to be captured by the image sensor automatically at the identified times.

3. The apparatus of claim 1, wherein the controller is configured to identify an appropriate time to capture the image based on movement of the camera relative to the position of the camera for a previously captured image.

4. The apparatus of claim 1, wherein the default spacing between Images corresponds to substantially no overlap between the captured images and, when no desired amount of overlap has been received, the appropriate times are identified by the controller to capture the images with substantially no overlap between the captured images, and wherein the plurality of captured images are combinable into a single compound image representing the scene.

5. The apparatus of claim 1,
    wherein the controller is configured to cause the camera to provide a notification to a user of the identified times.

6. The apparatus of claim 5,
    wherein the controller is further configured to repeatedly modify the notification to indicate proximity to the identified times.

7. The apparatus of claim 5, wherein notification is one of an audible notification and a visual notification.

8. The apparatus of claim 7, wherein modification of the audible notification includes modifying a pitch or volume of the audible notification, and wherein modification of the visual notification includes modifying operation of an LED display.

9. The apparatus of claim 5, wherein the notification is an audible notification and a visual notification.

10. The apparatus of claim 1,
    wherein the optical motion detector is configured to capture motion images and generate movement data as the camera moves in a linear path.

11. The apparatus of claim 1,
    wherein the optical motion detector is configured to capture images and generate movement data as the camera moves in a rotary path.

12. The apparatus of claim 1,
    wherein the optical motion detector is configured to capture motion images while the camera is held stationary, to generate movement data for a moving image.

13. The apparatus of claim 1, wherein the optical detector is configured to capture motion images at a frame rate which is greater than a frame rate of the image sensor.

14. A method of capturing images of a scene with a camera to produce a compound image of the scene, the method comprising:
    receiving input data including a desired amount of overlap to be included in images to be captured;
    storing the input data:
    capturing a first image with an image sensor of the camera;
    generating movement data with a movement detector by capturing and correlating a plurality of navigation images separate from the images captured by the image sensor, the movement data representative of movement of the camera;
    identifying an appropriate time for the image sensor to capture a second optical image based on the movement data and the amount of overlap if the desired amount of overlap has been received and a default spacing between images if no desired amount of overlap has been received; and
    capturing the second optical image with the image sensor at the identified appropriate time, the first and second image combinable into a multi-image scene.

15. The method of claim 14, wherein
    the step of capturing the second image with the image sensor comprises automatically capturing the second image at the identified appropriate time.

16. The method of claim 14, wherein the step of generating movement data comprises:
    providing navigation image sensor comprising an array of photo detectors;
    directing a first set of images onto the array of photo detectors;
    generating digital representations of the images in the first set based on outputs of the photo detectors;
    correlating the digital representations; and
    generating the movement data based on the correlation.

17. The method of claim 14, further comprising the step of:
    generating a notification on an LED display of the camera based on the identified appropriate time.

18. The method of claim 17, further comprising the step of:
    repeatedly modifying the notification on the LED display to indicate a current proximity to an appropriate time to capture the second image.

19. The method of claim 18, wherein modification of the notification includes modifying operation of an LED display.

20. A camera comprising:

an input unit configured to accent input data including a desired amount of overlap to be included in images to be captured;

a memory configured to changeably store the input data;

an image sensor for capturing optical images;

a first lens for directing the optical images onto the image sensor via a first optical path;

an optical movement detector separate from the image sensor configured to capture a plurality of navigation images and to generate movement data based on correlations among the navigation images;

a second lens for directing images onto the optical movement detector via a second optical path; and a controller coupled to the movement detector for identifying appropriate times for the image sensor to capture the optical images based on the movement data and the amount of overlap if the desired amount of overlap has been provided and a default spacing between the images if no desired amount of overlap has been provided.

21. The camera of claim 20, further comprising:

a user input device configured to allow a user to select at least one multi-image mode, the controller configured to identify appropriate times to capture images only during a multi-image mode session.

22. The camera of claim 21, wherein the at least one multi-image mode includes an automatic multi-image mode and feedback multi-image mode, and wherein the camera is configured such that the image sensor automatically captures the optical images at the identified times in the automatic multi-image mode, and is configured to provide a notification to the user at the identified times in the feedback multi-image mode.

23. The camera of claim 20, wherein the controller is configured to cause the camera to provide a notification to a user via an LED display on the camera and repeatedly modify the notification to indicate proximity to the identified times.

* * * * *